United States Patent
Lee et al.

(10) Patent No.: US 12,118,062 B2
(45) Date of Patent: Oct. 15, 2024

(54) METHOD AND APPARATUS WITH ADAPTIVE OBJECT TRACKING

(71) Applicant: Samsung Electronics Co., Ltd., Suwon-si (KR)

(72) Inventors: Seohyung Lee, Seoul (KR); Dongwook Lee, Suwon-si (KR); Changyong Son, Anyang-si (KR); SeungWook Kim, Seoul (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 688 days.

(21) Appl. No.: 17/246,803

(22) Filed: May 3, 2021

(65) Prior Publication Data

US 2022/0138493 A1    May 5, 2022

(30) Foreign Application Priority Data

Nov. 2, 2020  (KR) .......................... 10-2020-0144491

(51) Int. Cl.
   *G06F 18/00*    (2023.01)
   *G06F 18/214*   (2023.01)
   *G06T 7/73*     (2017.01)
   *G06V 10/25*    (2022.01)

(52) U.S. Cl.
   CPC .............. *G06F 18/214* (2023.01); *G06T 7/75* (2017.01); *G06V 10/25* (2022.01); *G06T 2207/20084* (2013.01)

(58) Field of Classification Search
   CPC ...... G06F 18/214; G06T 7/75; G06T 2207/20084; G06T 2207/10016; G06T 2207/20081; G06T 2207/20132; G06T 7/254; G06T 7/246; G06T 1/20; G06T 7/11; G06V 10/25; G06V 10/809; G06V 10/26; G06V 10/82; G06V 40/23; G06N 3/02
   USPC ....................................................... 382/103
   See application file for complete search history.

(56) References Cited

U.S. PATENT DOCUMENTS

| | | | |
|---|---|---|---|
| 7,095,786 B1 | 8/2006 | Schonfeld et al. | |
| 9,973,711 B2 | 5/2018 | Yang et al. | |
| 2006/0115922 A1 | 6/2006 | Araya et al. | |
| 2007/0120979 A1 | 5/2007 | Zhang et al. | |
| 2014/0072168 A1 | 3/2014 | Wu | |
| 2015/0161466 A1* | 6/2015 | Welinder | G06V 10/25 382/195 |

(Continued)

FOREIGN PATENT DOCUMENTS

| | | |
|---|---|---|
| JP | 2001-155164 A | 6/2001 |
| JP | 2006-245645 A | 9/2006 |

(Continued)

*Primary Examiner* — Neil R McLean
(74) *Attorney, Agent, or Firm* — NSIP Law

(57) ABSTRACT

Disclosed is a method and apparatus for adaptive tracking of a target object. The method includes method of tracking an object, the method including estimating a dynamic characteristic of an object in an input image based on frames of the input image, determining a size of a crop region for a current frame of the input image based on the dynamic characteristic of the object, generating a cropped image by cropping the current frame based on the size of the crop region, and generating a result of tracking the object for the current frame using the cropped image.

25 Claims, 11 Drawing Sheets

(56) References Cited

U.S. PATENT DOCUMENTS

| | | | |
|---|---|---|---|
| 2016/0381306 A1* | 12/2016 | Yang | H04N 23/698 |
| | | | 386/280 |
| 2018/0129934 A1* | 5/2018 | Tao | G06N 3/084 |
| 2018/0276845 A1 | 9/2018 | Bjorgvinsdottir et al. | |
| 2020/0043180 A1 | 2/2020 | Chen et al. | |
| 2020/0125880 A1* | 4/2020 | Wang | G06V 10/449 |

FOREIGN PATENT DOCUMENTS

| | | |
|---|---|---|
| JP | 2014-216830 A | 11/2014 |
| JP | 2015-33023 A | 2/2015 |
| KR | 2000-0054329 A | 9/2000 |
| KR | 10-2010-0117163 A | 11/2010 |
| WO | WO 2012/074362 A1 | 6/2012 |

* cited by examiner

METHOD AND APPARATUS WITH ADAPTIVE OBJECT TRACKING

CROSS-REFERENCE TO RELATED APPLICATIONS

This application claims the benefit under 35 USC § 119(a) of Korean Patent Application No. 10-2020-0144491 filed on Nov. 2, 2020, in the Korean Intellectual Property Office, the entire disclosure of which is incorporated herein by reference for all purposes.

BACKGROUND

Field

The following description relates to a method and apparatus with adaptive object tracking.

Description of Related Art

Automation of a recognition process has been implemented through a neural network model implemented, for example, by a processor as a special computing structure, which provides intuitive mapping for computation between an input pattern and an output pattern after considerable training. A trained ability to generate such mapping is the learning ability of a neural network. Furthermore, a neural network trained and specialized through special training has, for example, a generalization ability to provide a relatively accurate output with respect to an untrained input pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of tracking an object, the method including estimating a dynamic characteristic of an object in an input image based on frames of the input image, determining a size of a crop region for a current frame of the input image based on the dynamic characteristic of the object, generating a cropped image by cropping the current frame based on the size of the crop region, and generating a result of tracking the object for the current frame using the cropped image.

The dynamic characteristic may include a movement of the object, and the determining of the size of the crop region for the current frame may include increasing the size of the crop region, in response to the movement being larger than a threshold, and decreasing the size of the crop region, in response to the movement being smaller than the threshold.

The generating of the result of tracking the object may include selecting a neural network model corresponding to the size of the crop region from among neural network models for performing object tracking, and generating the result of tracking the object using the cropped image and the selected neural network model.

The neural network models may include a first neural network model for a first size of the crop region and a second neural network model for a second size of the crop region.

The selecting of the neural network model may include selecting the first neural network model from among the neural network models, in response to the size of the crop region being the first size, and selecting the second neural network model from among the neural network models, in response to the size of the crop region being the second size.

The first size may be smaller than the second size, and the first neural network model may be configured to amplify input feature information more than the second neural network.

The first size may be smaller than the second size, and the first neural network model may be configured to amplify input feature information more than the second neural network model by increasing a channel size using more weight kernels than the second neural network.

The first size may be smaller than the second size, and the first neural network model may be configured to amplify input feature information more than the second neural network model by using a smaller pooling window than a pooling window in the second neural network.

The neural network models may share at least one weight with each other.

In another general aspect, there is provided an apparatus for tracking an object, the apparatus including a memory configured to store instructions, and a processor configured to execute the instructions to estimate a dynamic characteristic of an object in an input image based on frames of the input image, determine a size of a crop region for a current frame of the input image based on the dynamic characteristic of the object, generate a cropped image by cropping the current frame based on the size of the crop region, and generate a result of tracking the object for the current frame using the cropped image.

The dynamic characteristic may include a movement of the object, and the processor may be configured to increase the size of the crop region, in response to the movement being larger than a threshold, and to decrease the size of the crop region, in response to the movement being smaller than the threshold.

The processor may be configured to select a neural network model corresponding to the size of the crop region from among neural network models configured to track the object, and generate the result of tracking the object using the cropped image and the selected neural network model.

The neural network models may include a first neural network model for a first size of the crop region and a second neural network model for a second size of the crop region.

The first size may be smaller than the second size, and the first neural network model may be configured to amplify input feature information more than the second neural network.

The first size may be smaller than the second size, and the first neural network model may be configured to amplify input feature information more than the second neural network model by increasing a channel size using more weight kernels than the second neural network.

The first size may be smaller than the second size, and the first neural network model may be configured to amplify input feature information more than the second neural network model by using a smaller pooling window than the second neural network.

In another general aspect, there is provided a n electronic device, including a camera configured to generate an input image based on sensed visual information, and a processor configured to estimate a dynamic characteristic of an object in the input image based on frames of the input image, determine a size of a crop region for a current frame of the input image based on the dynamic characteristic of the object, generate a cropped image by cropping the current frame based on the size of the crop region, and generate a result of tracking the object for the current frame using the cropped image.

The dynamic characteristic may include a movement of the object, and the processor may be configured to increase the size of the crop region, in response to the movement being larger than a threshold, and to decrease the size of the crop region, in response to the movement being smaller than the threshold.

The processor may be configured to select a neural network model corresponding to the size of the crop region from among neural network models configured to track the object, and generate the result of tracking the object using the cropped image and the selected neural network model.

Other features and aspects will be apparent from the following detailed description, the drawings, and the claims.

Figure 1:
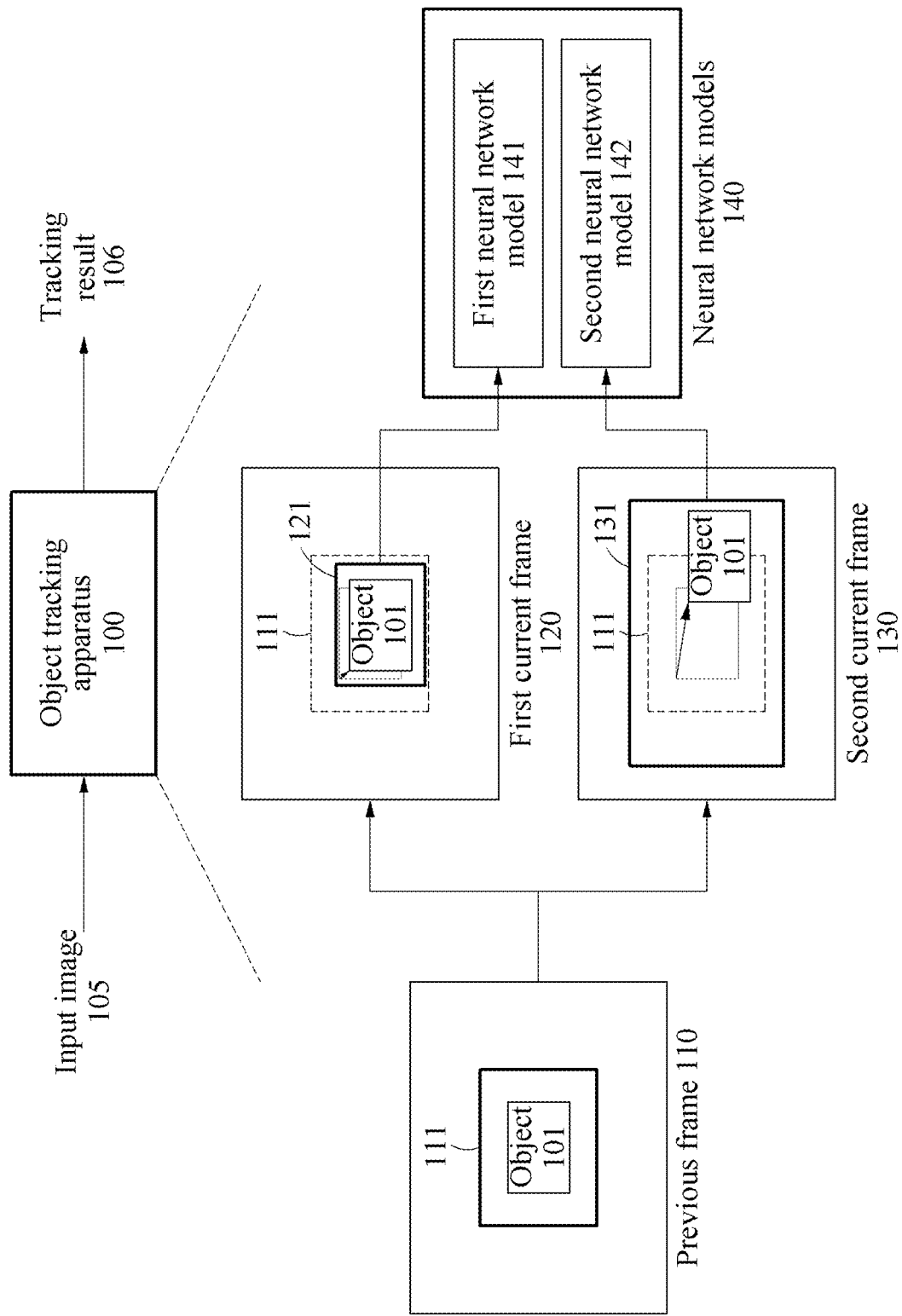
FIG. 1 illustrates an example of an operation of an object tracking apparatus for adaptively tracking an object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as first, second, A, B, (a), (b) may be used herein to describe various members, components, regions, layers, or sections, these members, components, regions, layers, or sections are not to be limited by these terms. These terms should be used only to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. The sequences, or the orders of the constituent elements are not limited by these terms.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like components and a repeated description related thereto may be omitted.

FIG. 1 illustrates an example of an operation of an object tracking apparatus for adaptively tracking a target object. Referring to FIG. 1, an object tracking apparatus 100 may track an object 101 in an input image 105 adaptively based on features of the object 101 and output a result 106 of tracking the object 101, hereinafter, the tracking result 106. For example, the features of the object 101 may include dynamic characteristics of the object 101 such as a change in size, a change in shape, and a change in location of the object 101. The change in size may be a change in the size relative to the initial size, and the change in shape may be a change in the shape relative to the initial shape. The change in location may be a change in the location relative to the initial location. The location change may also be referred to as a movement, and include a velocity of movement and/or a direction of movement. Hereinafter, the features of the object 101 may be described representatively through a movement of the object, and the following description may also apply to the other features of the object 101 such as the size change and the shape change. The object 101 may be a target to be tracked and referred to as a target object. A region corresponding to the object 101 may be specified through the tracking result 106.

The input image 105 may include image frames. In an example, the input image 105 may include a previous frame 110 and a current frame. FIG. 1 shows the current frame in two situations. A first current frame 120 shows a situation in which the movement of the object 101 is relatively small, and a second current frame 130 shows a situation in which the movement of the object 101 is relatively large. In these situations, the object tracking apparatus 100 may predict the movement of the object 101 in the current frame of the input image 105 and adaptively track the object 101 based on the predicted movement.

In an example, the object tracking apparatus 100 may adaptively set the size of a crop region based on the predicted movement to minimize amplification of peripheral information or information loss. When it is predicted that the movement of the object 101 is likely to be small as in the first current frame 120, the object tracking apparatus 100 may set the size of the crop region to be the same as that of the first crop region 121. If the size of the crop region is maintained to be the same as the size of a previous crop region 111 in the previous frame 110, an unnecessary background analysis operation may be performed, or unnecessary information may be amplified by such an operation, whereby the tracking accuracy may decrease. In another example, when it is predicted that the movement of the object 101 is likely to be large as in the second current frame 130, the object tracking apparatus 100 may set the size of the crop region to be large, as shown in a second crop region 131. If the size of the crop region is maintained to be the same as the size of the previous crop region 111, the object 101 may be out of the crop region, and information loss may cause object tracking to fail.

In an example, the object tracking apparatus 100 may generate the tracking result 106 by selectively using neural network models 140 depending on the size of the crop region. A first neural network model 141 may be suitable for a small crop region like the first crop region 121, and a second neural network model 142 may be suitable for a large crop region like the second crop region 131. The small crop region may include less information than the large crop region and may need to be analyzed more finely. Accordingly, the first neural network model 141 may have a structure capable of performing a finer operation than the second neural network model 142. For example, the first neural network model 141 may use more weight kernels and/or a smaller pooling window than the second neural network model 142, thereby amplifying input feature information more than the second neural network model 142.

Each of the neural network models may correspond to a deep neural network (DNN) including a plurality of layers and may be simply referred to as a neural network. The plurality of layers may include an input layer, hidden layers, and an output layer. The neural network may include a fully connected network (FCN), a convolutional neural network (CNN), a recurrent neural network (RNN), perceptron, feed forward (FF), a radial basis network (RBF), deep feed forward (DFF), a long short term memory (LSTM), a gated recurrent unit (GRU), an autoencoder (AE), a variational autoencoder (VAE), a denoising autoencoder (DAE), a sparse autoencoder (SAE), Markov Chain (MC), a Hopfield network (HN), a Boltzmann machine (BM), a restricted Boltzmann machine (RBM), a Depp belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example example, at least a portion of the plurality of layers in the neural network may correspond to the CNN, and another portion thereof may correspond to the FCN. In this case, the CNN may be referred to as convolutional layers, and the FCN may be referred to as fully connected layers.

Data input into each layer in the CNN may be referred to as an input feature map, and data output from each layer may be referred to as an output feature map. The input feature map and the output feature map may also be referred to as activation data. When a convolutional layer corresponds to an input layer, an input feature map of the input layer may be an input image.

The neural network may be trained based on deep learning to perform inference suitable for the purpose of training by mapping input data and output data that are in a nonlinear relationship. Deep learning is a machine learning technique for training a neural network to perform operations such as image or speech recognition using a big data set. Deep learning may be construed as an optimization problem solving process of finding a point at which energy is minimized while training a neural network using prepared training data.

Through supervised or unsupervised learning of deep learning, a structure of the neural network or weights corresponding to a model may be obtained, and the input data and the output data may be mapped to each other by the weights. If the width and the depth of the neural network are sufficient, the neural network may have a capacity sufficient to implement a predetermined function. The neural network may achieve an optimized performance when learning a sufficiently large amount of training data through an appropriate training process.

The neural network may be expressed as being trained "in advance". Here, "in advance" means before the neural network is "started". That the neural network "starts" means that the neural network is ready for inference, and has been trained. For example, that the neural network that is "started" or ready to be implemented may include that the neural network is loaded into a memory, or that input data for inference is input into the neural network after the neural network is loaded into the memory.

Figure 2:
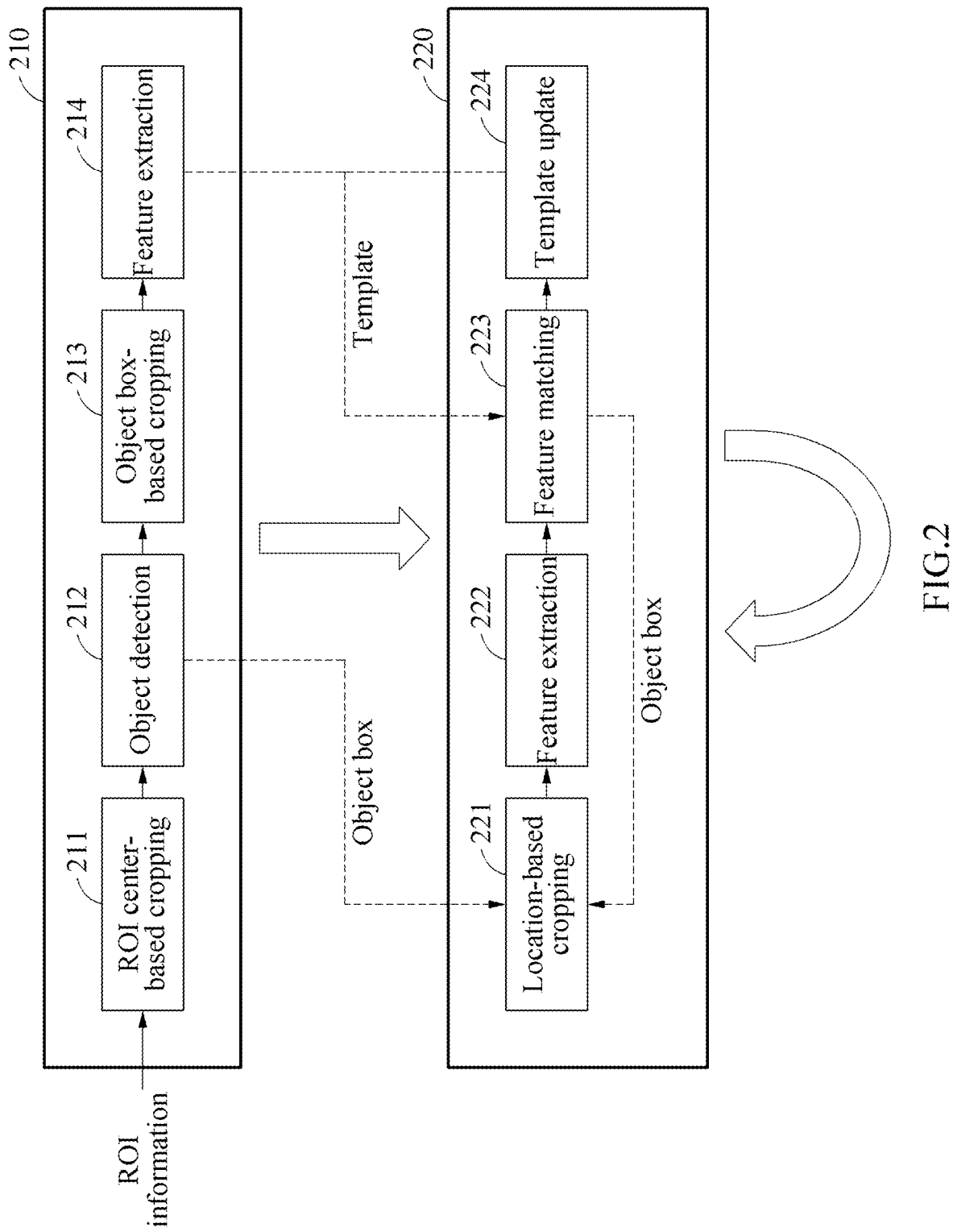
FIG. 2 illustrates an example of a tracking workflow.

FIG. 2 illustrates an example of a tracking workflow. FIG. 2 illustrates an example of a method of training a neural network to generate an image. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

An object tracking apparatus may perform operations 211 to 214 shown in a box 210 for a first frame of an input image. In operation 211, the object tracking apparatus performs region of interest (ROI) center-based cropping based on ROI information. For example, a user may tap an object displayed on a screen of a smart phone or digital camera to set an ROI with the location of tapping as a center of the ROI. The object tracking apparatus may generate an ROI-based cropped image by cropping the first frame by a size (for example, 255*255*3) with the ROI centered. In an example, the size may be predetermined.

In operation 212, the object tracking apparatus detects an object in the cropped image and generates an object box. The location of the object in the initial frame may be specified by the object box. For example, the center of the object box may be used as a reference location that specifies the location of the object in the initial frame. The object tracking apparatus may determine an object box for each frame, and the object box for each frame may correspond to a result object tracking.

In operation 213, the object tracking apparatus performs object box-based cropping. The object tracking apparatus may generate an object box-based cropped image that is same in size as that of the object box by cropping the initial frame to the object box, or may generate an object box-based cropped image in that is different in size from (for example, larger or smaller than) that of the object box by cropping the initial frame to a region obtained by applying a magnification to the object box. For example, the size of the object box-based cropped image may be 127*127*3.

In operation 214, the object tracking apparatus extracts features from the object box-based cropped image. The object tracking apparatus may use a CNN-based feature extractor as a backbone network. The object tracking apparatus may determine a template based on an extracted feature map. In an example, the object tracking apparatus may generate the template by adjusting the size of the feature map through the neck. For example, the size of the feature map may be 16*16*256, and the size of the template may be 7*7*256.

In an example, the object tracking apparatus may perform operations 221 to 224 shown in a box 220 for a second frame of the input image. In operation 221, the object tracking apparatus performs location-based cropping based on the object box. The object box may be determined through operation 212. The object tracking apparatus may generate a location-based cropped image by cropping the second frame of the input image by a size (for example, 255*255*3) with the object box centered.

In operation 222, the object tracking apparatus extracts features from the corresponding cropped image. The object tracking apparatus may use a CNN-based feature extractor as a backbone network, and the feature extractor used here may be different from that used in operation 214. The feature extractor used in operation 222 may extract features from an input of a larger size than features extracted by the feature extractor used in operation 214. The object tracking apparatus may adjust the size of a feature map output from the feature extractor through the neck. For example, the object tracking apparatus may adjust the size of the feature map from 32*32*256 to 31*31*64.

In operation 223, the object tracking apparatus performs feature matching between the feature map and the template for the current frame (the second frame). The template may be determined through operation 214, and the feature map may be determined through operation 222. In this example, the object tracking apparatus may use a CNN-based region proposal network (RPN). The RPN may correspond to the head. The object tracking apparatus may perform feature matching to determine an object box indicating a region that matches the template in the feature map. The object box may specify the location of the object in the second frame. For example, the center of the object box may be used as a reference location that specifies the location of the object in the second frame. In operation 224, the object tracking apparatus updates the template based on the object box.

When the object box of the second frame is determined, a movement of the object may be predicted accordingly. Thereafter, the object tracking apparatus may perform object tracking that is adaptive to the movement of the object.

In an example, the object tracking apparatus may predict the movement of the object based on a difference between a previous reference location of the object in the previous frame (the first frame) and a current reference location of the object in the current frame (the second frame). In this example, the center of the object box may be used as each reference location. The movement predicted as described above may be used to set the crop size in a next frame (a third frame) and to select a neural network model for performing object tracking (for example, feature extraction and feature matching). For example, the object tracking apparatus may set the size of a crop region for the next frame (the third frame) to be large when the object movement of the object is large, and may set the size of the crop region to be small when the movement of the object is small.

The object tracking apparatus may perform operations 221 to 224 shown in the box 220 for the third frame of the input image, considering the movement of the object. More specifically, the object tracking apparatus may crop the third frame to the crop region for a size that is set based on the movement of the object. In an example, the object tracking apparatus may perform object tracking by selectively using a neural network model corresponding to a cropped image of variable size from among neural network models. For example, when the movement of the object is small, the object tracking apparatus may crop the third frame to a crop region of small size, and may perform object tracking by selecting a neural network model that uses small input data. When the movement of the object is large, the object tracking apparatus may crop the third frame to a crop region of large size, and may perform object tracking by selecting a neural network model that uses large input data.

In an example, the neural network model may be implemented to perform feature extraction on an image of variable size, or may be implemented to perform both feature extraction and feature matching on an image of variable size. In the former case, the neural network model may correspond to a feature extractor. In the latter case, the neural network model may correspond to a combination of the feature extractor, the neck, and the head of a neural network, such, as, for example, an RPN. The object tracking apparatus may iteratively perform, for the remaining frames of the input image, the operations of predicting or estimating the movement of the object and performing object tracking adaptively to the movement of the object. Accordingly, a tracking result that is adaptive to the movement of the object of the input image may be generated.

Figure 3:
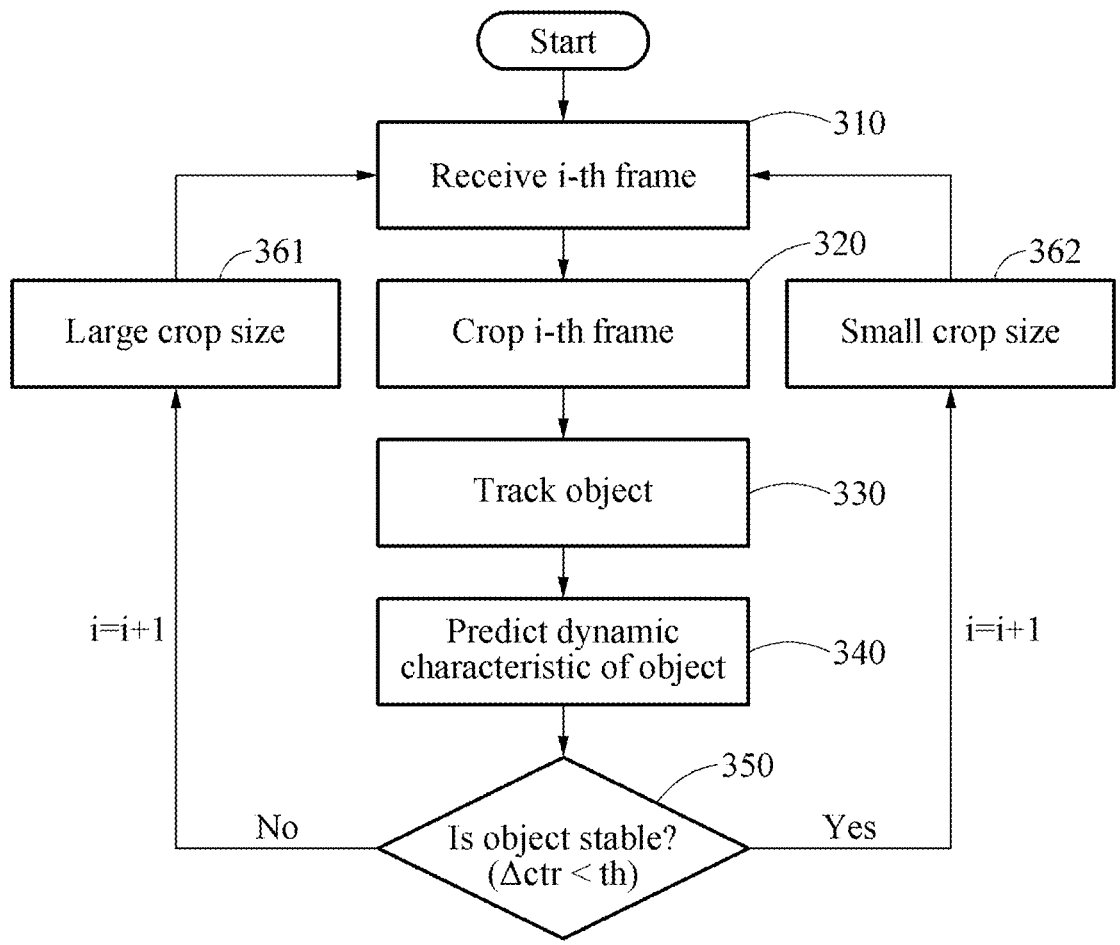
FIG. 3 illustrates an example of tracking an object by adjusting a crop size.

FIG. 3 illustrates an example of tracking an object by adjusting a crop size. FIG. 3 illustrates an example of a method of training a neural network to generate an image. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, an object tracking apparatus receives an i-th frame of an input image. Since two object boxes are required to predict a movement of an object, i may be an integer greater than or equal to "2". In operation 320, the object tracking apparatus crops the i-th frame. In operation 330, the object tracking apparatus performs object tracking based on a cropped image. The object tracking apparatus may extract features from the cropped image, and generate an object tracking result by comparing the extracted features with a template. The object tracking result may include an object box.

In operation 340, the object tracking apparatus predicts a dynamic characteristic of the object. In operation 350, the object tracking apparatus determines whether the object is stable. For example, the dynamic characteristic may include a change of size, a change of shape, and a change of location (movement) of the object. Hereinafter, a case where the dynamic characteristic is a movement will be described. However, the following description may also apply to the other dynamic characteristics such as the change of size and the change of shape.

Figure 4:
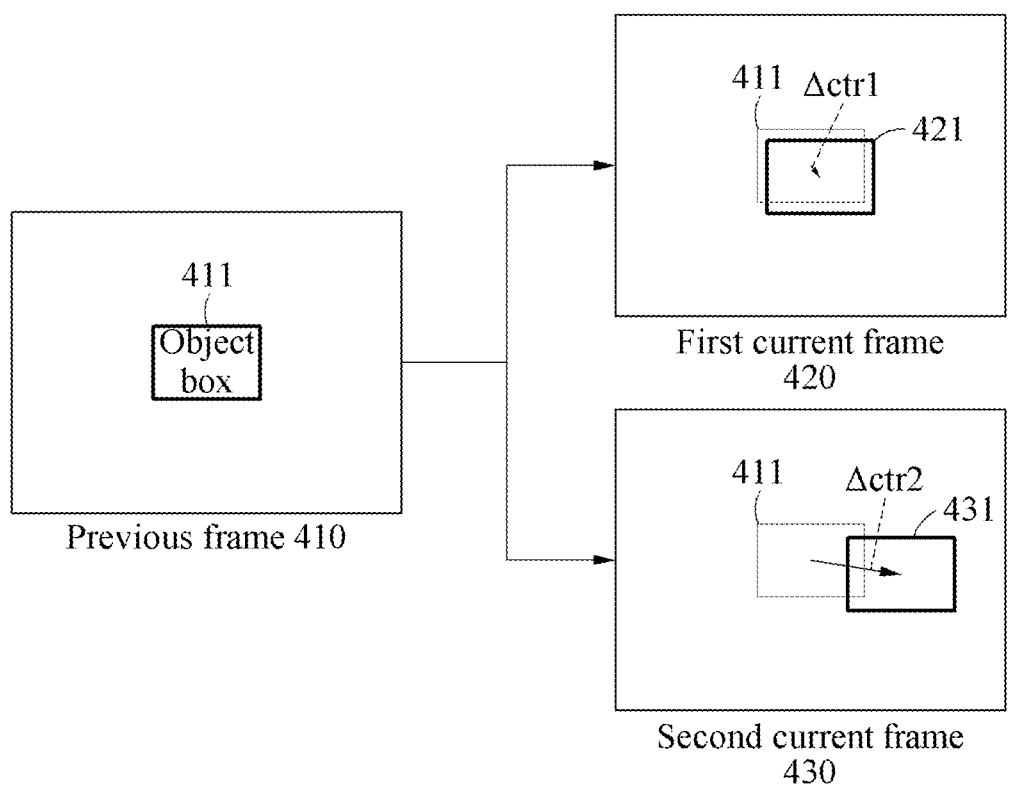
FIG. 4 illustrates an example of determining the stability of an object.

The object tracking apparatus may predict a movement of the object based on a difference between a reference location of an (i−1)-th frame and a reference location of the i-th frame. In an example, the center of the object box determined for each frame may be used as a reference location of each frame. For example, the object tracking apparatus may use a difference between the center of the object box for the (i−1)-th frame and the center of the object box for the i-th frame as the movement of the object for the i-th frame. Referring to FIGS. 3 and 4 together, "Δctr1" in FIG. 4 denotes the difference between the center of an object box 411 for a previous frame 410 and the center of an object box 421 for a first current frame 420. "Δctr2" denotes a difference between the center of the object box 411 for the previous frame 410 and the center of an object box 431 for a second current frame 430.

In an example, the object tracking apparatus may determine whether the object is stable through a comparison between the difference Δctr between the centers, i.e., the movement of the object, and a threshold "th." When Δctr meets or is greater than th, i.e., when the object moves much and is not stable, in operation 361, the object tracking apparatus may set a crop size to be larger. In FIG. 4, it may be assumed Δctr2 is greater than th. When Δctr fails to meet or is less than th, i.e., when the object moves less and is stable, in operation 362 the object tracking apparatus may set the crop size to be small. In FIG. 4, it may be assumed Δctr1 is smaller than th. For example, the object tracking apparatus may use fixed values for the large crop size and the small crop size, for example, 255*255 and 191*191, respectively. In another example, the object tracking apparatus may use a method of increasing or decreasing the crop size based on the stability of the object, for example, in inverse proportion to the stability.

Thereafter, the object tracking apparatus may increase the value of i to i+1 and repeat the above operations for an (i+1)-th frame. In operation 320, the object tracking apparatus may crop the (i+1)-th frame through a crop region of variable size. The object tracking apparatus may crop the (i+1)-th frame to a large crop region when a large crop size is adopted in the procedure for the i-th frame, and may crop the (i+1)-th frame to a small crop region when a small crop size is adopted. As described above, a cropped image for each frame may be generated adaptively to the movement of the object to trach the object.

Figure 5:
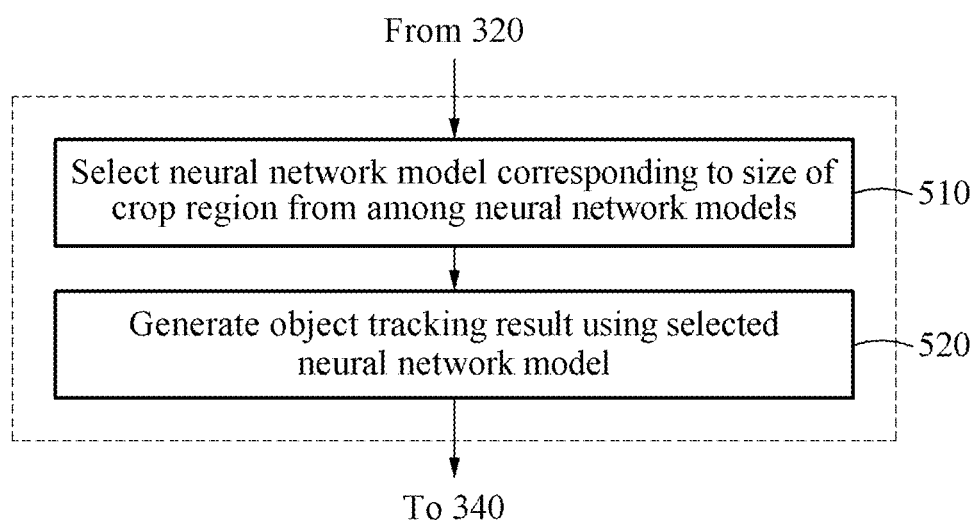
FIG. 5 illustrates an example of tracking an object using models.

FIG. 5 illustrates an example of tracking an object using models. FIG. 5 illustrates an example of a method of training a neural network to generate an image. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, an object tracking apparatus selects a neural network model corresponding to a size of a crop region from among neural network models. In operation 520, the object tracking apparatus generates an object tracking result using the selected neural network model. Such selective use of neural network models may improve both tracking accuracy and tracking speed (average speed and peak speed). Operations 510 and 520 may correspond to operation 330 of FIG. 3. In an example, operation 510 may be performed after operation 320 of FIG. 3, and operation 340 of FIG. 3 may be performed after operation 520.

For example, the neural network models may include a first neural network model for a first size of the crop region and a second neural network model for a second size of the crop region. The object tracking apparatus may select the first neural network model from among the neural network models when the determined size of the crop region is the first size, and select the second neural network model from among the neural network models when the determined size of the crop region is the second size.

If the first size is smaller than the second size, the first neural network model may amplify input feature information more than the second neural network model. That is because a small crop region may include less information than a large crop region and may be analyzed more finely. Accordingly, the first neural network model may have a structure capable of performing a finer operation than the second neural network model. For example, the first neural network model may use more weight kernels and/or a smaller pooling window than the second neural network model, thereby amplifying input feature information more than the second neural network model.

Figure 6:
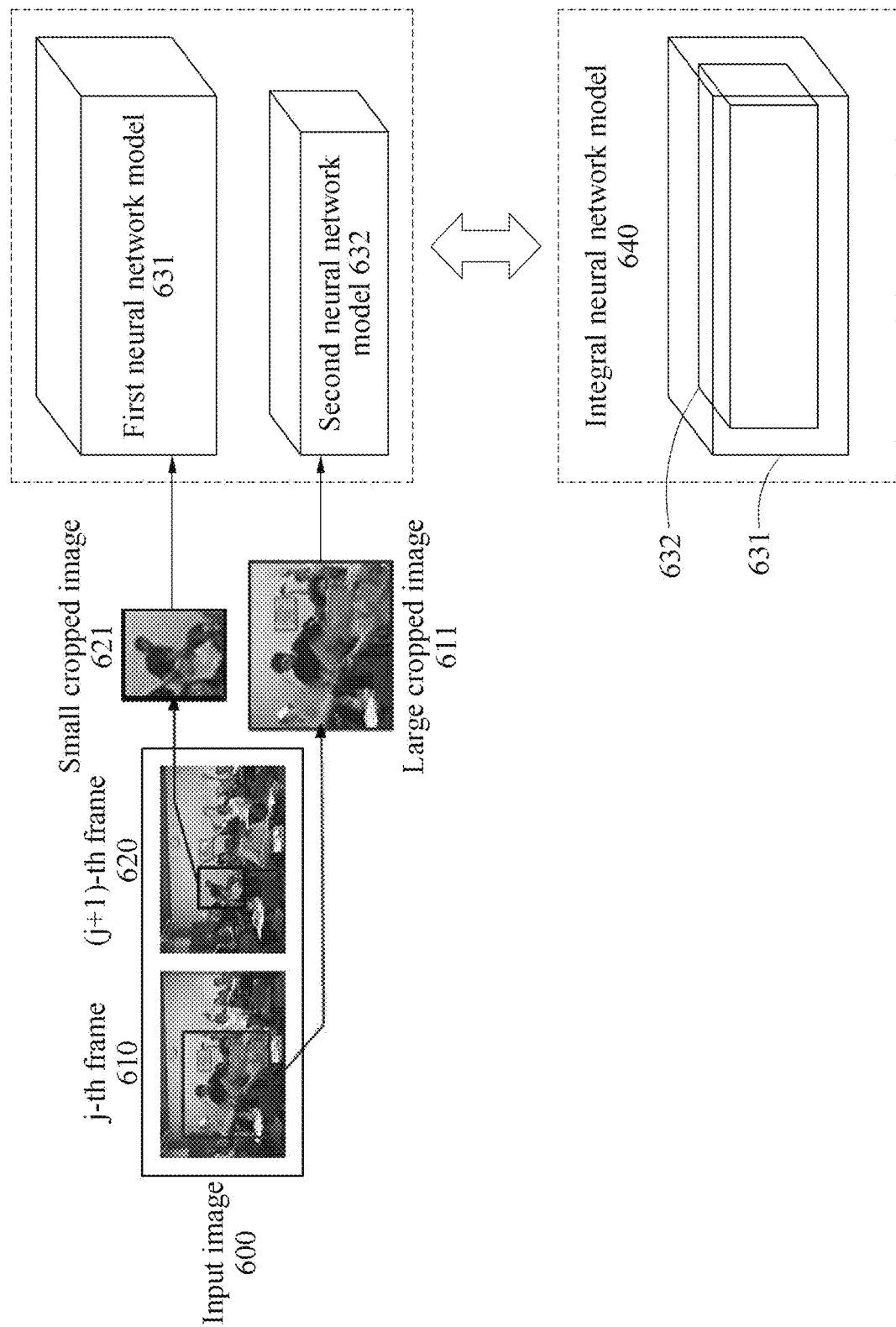
FIG. 6 illustrates examples of structures of neural network models.

FIG. 6 illustrates examples of structures of neural network models. Referring to FIG. 6, an object tracking apparatus crops a large cropped image 611 from a j-th frame 610 of an input image 600 and crops a small cropped image 621 from a (j+1)-th frame 620 of the input image 600. The object tracking apparatus may generate an object tracking result for the j-th frame 610 by inputting the large cropped image 611 to a second neural network model 632, and generate an object tracking result for the (j+1)-th frame 620 by inputting the small cropped image 621 to a first neural network model 631.

FIG. 6 shows the first neural network model 631 larger than the second neural network model 632 to indicate that the first neural network model 631 amplifies input features more and performs a finer analysis than the second neural network model 632. For example, the first neural network model 631 may include more layers than the second neural network model 632. In another example, even if the first neural network model 631 and the second neural network model 632 include the same number of layers, a layer of the first neural network model 631 may perform more operations per pixel of input features or induce more operations than a corresponding layer of the second neural network model 632.

In an example, a first layer of the first neural network model 631 corresponds to a second layer of the second neural network model 632. When the first layer and the second layer are convolutional layers, the first layer of the first neural network model 631 may use more weight kernels than the second layer of the second neural network model 632. Accordingly, an output feature map of the first layer of the first neural network model 631 may include more information in the channel direction than an output feature map of the second layer of the second neural network model 632. When the first layer of the first neural network model 631 and the second layer of the second neural network model 632 are pooling layers, the first layer of the first neural network model 631 may use a smaller pooling window than the second layer of the second neural network model 632. In an example, if data of the same size are input to the first layer of the first neural network model 631 and the second layer of the second neural network model 632, the output feature map of the first layer of the first neural network model 631 may include more information in the width and height directions than the output feature map of the second layer of the of the second neural network model 632. Accordingly, more operations per pixel of the input features may be performed by the first neural network model 631 than by the second neural network model 632.

The first neural network model 631 and the second neural network model 632 may share at least one weight with each other. If the first neural network model 631 includes all weights of the second neural network model 632, the first neural network model 631 may structurally include the second neural network model 632. In this case, the first neural network model 631 and the second neural network model 632 may form an integral neural network model 640. Since the integral neural network model 640 stores the first neural network model 631 and the second neural network model 632 to overlap each other, the memory space may be efficiently used.

Figure 7:
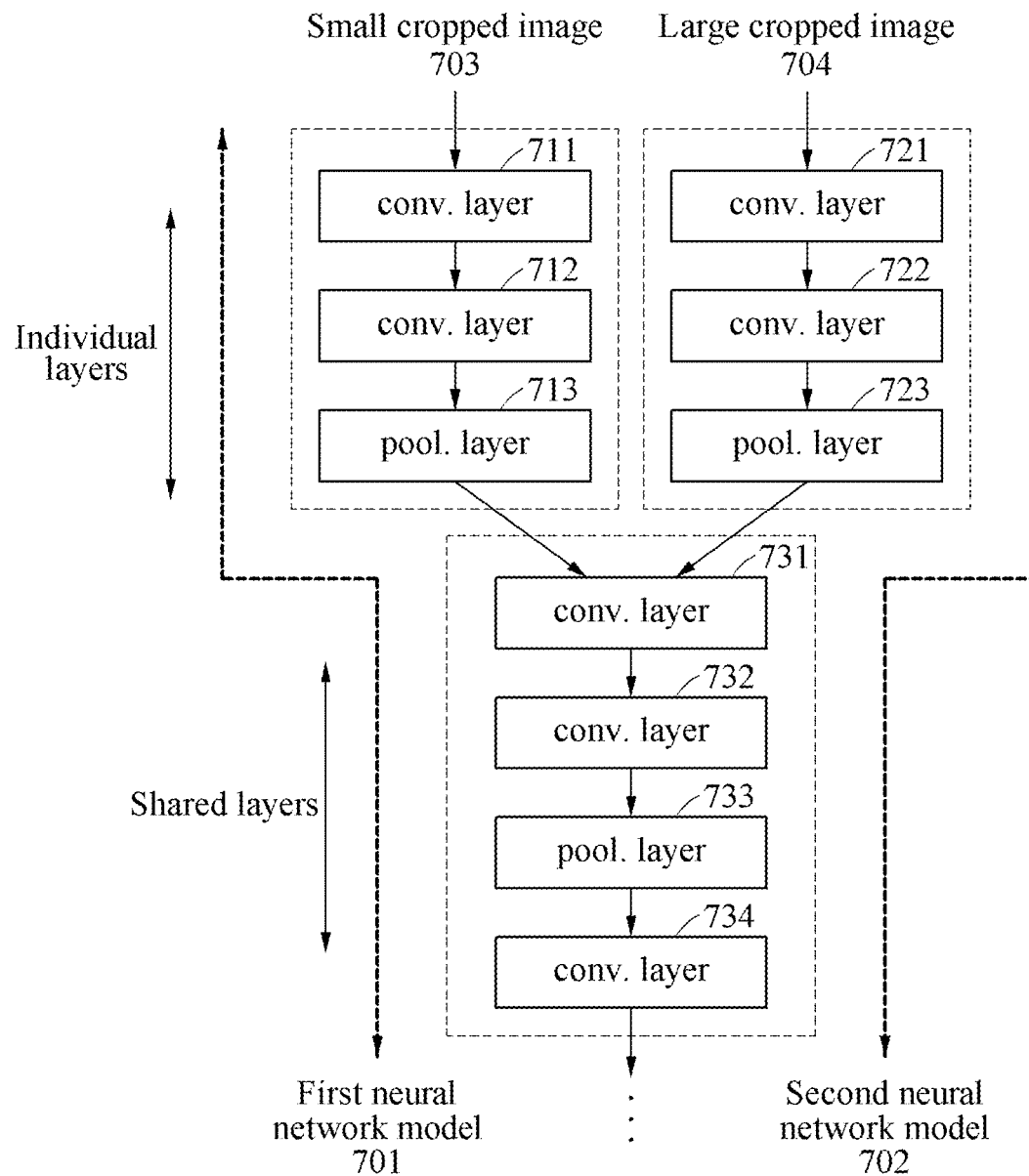
FIG. 7 illustrates an example of layer sharing.

FIG. 7 illustrates an example of layer sharing. Referring to FIG. 7, a first neural network model 701 tracks an object in a small cropped image 703, and a second neural network model 702 tracks an object in a large cropped image 704. The first neural network model 701 includes layers 711 to 713 and 731 to 734, and the second neural network model 702 includes layers 721 to 723 and 731 to 734. The layers 711 to 713 and the layers 721 to 723 are separate elements of the respective neural network models and thus, may be referred to as separate layers. The layers 731 to 734 are common elements of the respective neural network models and thus, may be referred to as shared layers. A separate layer occupies a separate memory space for each neural network model, whereas a shared layer is stored in a common memory space, thereby reducing memory usage.

Although not shown in FIG. 7, the object tracking apparatus may resize each cropped image to fit the input size of each neural network model before being input to each neural network model. For example, the object tracking apparatus may resize the small cropped image 703 to 199*199*3 and input the resized cropped image 703 to the convolutional layer 711. The output of the convolutional layer 711 may be in size of 100*100*16, and the output of the convolutional layer 712 may be in size of 100*100*32. The pooling layer 713 may perform pooling (for example, max pooling) using a 2*2 pooling window, and output a feature map of 50*50*32 accordingly.

Further, the object tracking apparatus may resize the large cropped image 704 to 299*299*3 and input the resized cropped image 704 to the convolutional layer 721. The output of the convolutional layer 721 may be in size of 150*150*8, and the output of the convolutional layer 722 may be in size of 150*150*16. The outputs of the convolutional layers 711 and 712 include 16 and 32 channels, respectively, and the outputs of the convolutional layers 721 and 722 include 8 and 16 channels, respectively. The outputs of the convolutional layers 711 and 712 include more channels than the outputs of the convolutional layers 721 and 722. This is because 16 and 32 weight kernels are used in the convolutional layers 711 and 712, respectively, while 8 and 16 weight kernels are used in the convolutional layers 721 and 722, respectively.

The pooling layer 723 may perform pooling (for example, max pooling) using a 3*3 pooling window, and output a feature map of 50*50*32 accordingly. The output of the pooling layer 723 and the output of the pooling layer 713 may have the same dimension. Features in the small cropped image 703 have a smaller dimension than features of the large cropped image 704 at the time of being input to the first neural network model 701. However, after passing through the pooling layers 713 and 723, the features in the small cropped image 703 are amplified by the first neural network model 701 to have the same dimension as the features in the large cropped image 704. As such, the first neural network model 701 may amplify input feature information more than the second neural network model 702.

The shared layers of the neural network models 701 and 702 are somewhat different from the concept of the integral neural network model 640 of FIG. 6. A model includes another model in the cases of the integral neural network model 640, whereas all data such as weights are the same in the case of the shared layers, which is not the concept that a model includes another model. Through the integration of the respective separate layers of the first neural network model 701 and the second neural network model 702, the first neural network model 701 may include the second neural network model 702, whereby the integral neural network model 640 may be derived accordingly. In an example, the integration may include training the neural network models 701 and 702 such that the weights of the first neural network model 701 include the weights of the second neural network model 702. This training process will be further described with reference to FIG. 8.

Figure 8:
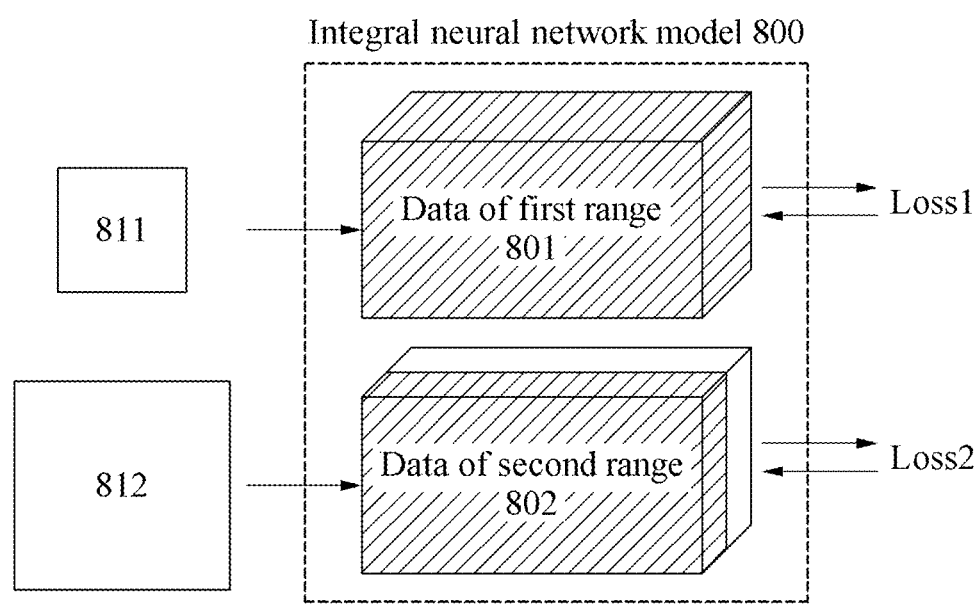
FIG. 8 illustrates an example of training a neural network model.

FIG. 8 illustrates an example of training a neural network model. Referring to FIG. 8, data 801 of a first range of an integral neural network model 800 may be trained based on a small training image 811 and a first loss (Loss1), and data 802 of a second range may be trained based on a large training image 812 and a second loss (Loss2). Data 801 and data 802 refers to the data comprising the layers of the respective neural network models. The data 802 of the second range may correspond to a subset of the data 801 of the first range. For example, the data 801 of the first range and the data 802 of the second range may have a relationship between all layers and some layers, between all weights and some weights, and between the total bit precision and a partial bit precision. For example, like the layers 711 and 721 or 712 and 722 of FIG. 7, the data 801 of the first range may correspond to all (for example, 16 or 32) weight kernels, and the data 802 of the second range may correspond to half (for example, 8 or 16) weight kernels.

The data 801 of the first range may be trained by obtaining the first loss (Loss1) through the output of the integral neural network model 800 for the small training image 811 and updating the data 801 of the first range with the first loss (Loss1). Further, the data 802 of the second range may be trained by obtaining the second loss (Loss2) through the output of the integral neural network model 800 for the large training image 812 and updating the data 802 of the second range with the second loss (Loss2). In this case, the data 802 of the second range may be selectively trained by masking a remaining portion of the data 801 of the first range excluding the data 802 of the second range. For example, in the case of training the layers 721 and 722 of FIG. 7, half (for example, 8 or 16) weight kernels corresponding to a training target may be trained through the second loss (Loss2), in a situation in which the remaining weight kernels, excluding the half (for example, 8 or 16) weight kernels corresponding to the training target, among all (for example, 16 or 32) weight kernels, are concealed by being multiplied by a mask of remaining zero values.

In another example, the data 802 of the second range may be obtained through pruning. In an example, the data 801 of the first range may be determined by training the integral neural network model 800, and the data 802 of the second range may be derived by pruning the data 801 of the first range. Pruning is lightens a model by removing duplicate weight values (for example, zero values), and may include structured pruning and unstructured pruning. Structured uses structural elements (for example, channels) as a unit of pruning, and unstructured pruning prunes duplicate values without using such a structural unit. The data 802 of the second range may be derived through structured pruning and/or unstructured pruning of the data 801 of the first range.

Figure 9:
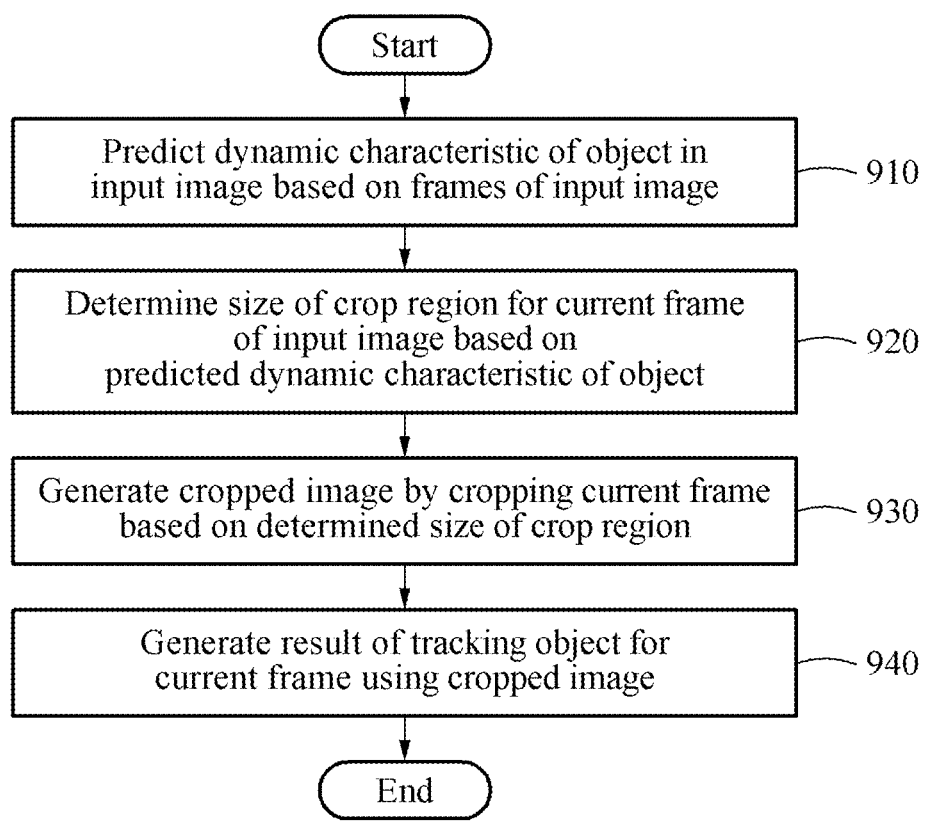
FIG. 9 illustrates an example of an object tracking method.

FIG. 9 illustrates an example of an object tracking method. FIG. 9 illustrates an example of a method of training a neural network to generate an image. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-8 are also applicable to FIG. 9, and are incorporated herein by reference. Thus, the above description may not be repeated here.

Referring to FIG. 9, in operation 910, an object tracking apparatus predicts a dynamic characteristic of an object in an input image based on frames of the input image. In operation 920, the object tracking apparatus determines a size of a crop region for a current frame of the input image based on the predicted dynamic characteristic of the object. In operation 930, the object tracking apparatus generates a cropped image by cropping the current frame based on the determined size of the crop region. In operation 940, the object tracking apparatus generates a result of tracking the object for the current frame using the cropped image.

Figure 10:
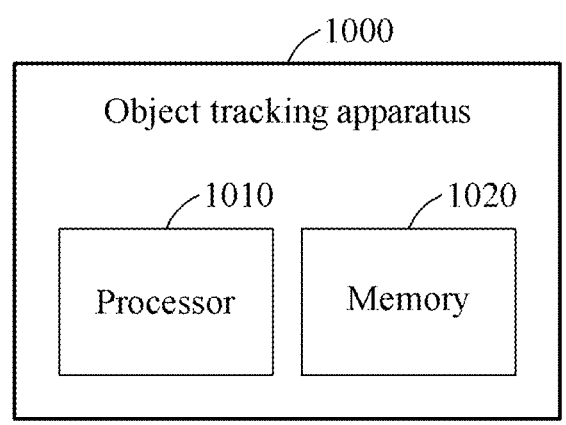
FIG. 10 illustrates an example of a configuration of an object tracking apparatus.

FIG. 10 illustrates an example of a configuration of an object tracking apparatus. Referring to FIG. 10, an object tracking apparatus 1000 includes a processor 1010 and a memory 1020. The memory 1020 may be connected to the processor 1010, and store instructions executable by the processor 1010, data to be calculated by the processor 1010, or data processed by the processor 1010. The memory 1020 includes a non-transitory computer readable medium, for example, a high-speed random access memory, and/or a non-volatile computer readable storage medium, for example, at least one disk storage device, flash memory device, or other non-volatile solid state memory devices.

The memory 1020 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory may be implemented as electrically erasable programmable read-only memory (EEPROM), a flash memory, magnetic ram (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), a holographic memory, molecular electronic memory device, or insulator resistance change memory. Further description of the memory 1020 is given below.

The processor 1010 may be a hardware-implemented image apparatus for having a circuit that is physically structured to execute desired operations. For example, the desired operations may include code or instructions included in a program. The hardware-implemented clipping and convolution apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 1010 is given below.

The processor 1010 may execute instructions stored in the memory 1020 to perform the operations described with reference to FIGS. 1 to 9 and 11. For example, the processor 1010 may predict a movement of the object based on a difference between a previous reference location of the object in a previous frame of the input image and a current reference location of the object in the current frame of the input image, determine the size of the crop region for the current frame based on the predicted movement of the object, generate the cropped image by cropping the current frame based on the current reference location of the object and the determined size of the crop region, and generate a result of tracking the object for the current frame using the cropped image. In addition, the description provided with reference to FIGS. 1 to 9 and 11 may apply to the object tracking apparatus 1000.

Figure 11:
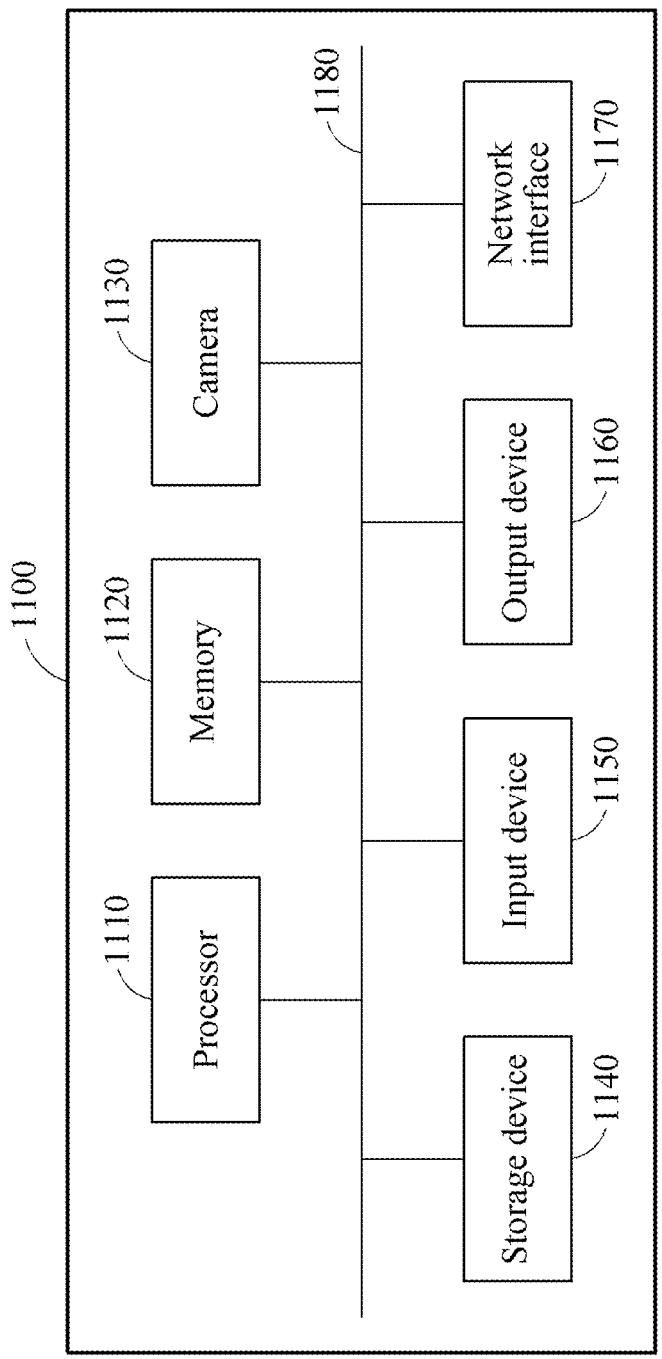
FIG. 11 illustrates an example of a configuration of an electronic device.

FIG. 11 illustrates an example of a configuration of an electronic device. Referring to FIG. 11, an electronic device 1100 may acquire an input image and track an object in the acquired input image. Further, the electronic device 1100 may perform operations associated with the tracked object. The electronic device 1100 may structurally and/or functionally include the object tracking apparatus 100 of FIG. 1 and/or the object tracking apparatus 1000 of FIG. 10.

The electronic device 1100 may include a processor 1110, a memory 1120, a camera 1130, a storage device 1140, an input device 1150, an output device 1160, and a network interface 1170 that may communicate with each other through a communication bus 1180. For example, the electronic device 1100 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as a smart vehicle.

The processor 1110 may be a hardware-implemented image apparatus for having a circuit that is physically structured to execute desired operations. For example, the desired operations may include code or instructions included in a program. The hardware-implemented clipping and convolution apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. The processor 1110 executes instructions or functions to be executed in the electronic device 1100. For example, the processor 1110 may process the instructions stored in the memory 1120 or the storage device 1140. The processor 1110 may perform the operations described through FIGS. 1 to 10. Further description of the processor 1110 is given below.

The memory 1120 stores data for object tracking. The memory 1120 may include a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory may be implemented as electrically erasable programmable read-only memory (EEPROM), a flash memory, magnetic ram (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), a holographic memory, molecular electronic memory device, or insulator resistance change memory. Further description of the memory 1020 is given below. The memory 1120 may store instructions to be executed by the processor 1110 and may store related information while software and/or an application is executed by the electronic device 1100.

The camera 1130 may capture a photo and/or a video. For example, the camera 1130 may capture a user image including the body and/or the face of a user. The camera 1130 may be a three-dimensional (3D) camera configured to provide a 3D image including depth information of objects.

The storage device 1140 includes a computer-readable storage medium or computer-readable storage device. The storage device 1140 may store a variety of data to be used in the object tracking process. The storage device 1140 may store a more quantity of information than the memory 1120 for a long time. For example, the storage device 1140 may include a magnetic hard disk, an optical disk, a flash memory, a floppy disk, or other non-volatile memories known in the art.

The input device 1150 may receive an input from the user in traditional input manners through a keyboard and a mouse, and in new input manners such as a touch input, a voice input, and an image input. For example, the input device 1150 may include a keyboard, a mouse, a touch screen, a microphone, or any other device that detects the input from the user and transmits the detected input to the electronic device 1100.

The output device 1160 may provide an output of the electronic device 1100 to the user through a visual, auditory, or tactile channel. The output device 1160 may include, for example, a display, a touch screen, a speaker, a vibration generator, or any other device that provides the output to the user. The network interface 1170 may communicate with an external device through a wired or wireless network.

The object tracking apparatus 100, object tracking apparatus 1000 and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of object tracking. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    estimating a dynamic characteristic of an object in an input image based on frames of the input image, wherein the dynamic characteristic of the object includes at least one of a change of size, a change of shape, or a change of location of the object;
determining a size of a crop region for a current frame of the input image based on the dynamic characteristic of the object;
generating a cropped image by cropping the current frame based on the size of the crop region; and
generating a result of tracking the object for the current frame using the cropped image.

2. The method of claim 1, wherein the dynamic characteristic comprises a movement of the object, and
the determining of the size of the crop region for the current frame comprises increasing the size of the crop region, in response to the movement meeting a threshold, and decreasing the size of the crop region, in response to the movement failing to meet the threshold.

3. The method of claim 1, wherein the generating of the result of tracking the object comprises:
selecting a neural network model corresponding to the size of the crop region from among neural network models configured to perform object tracking; and
generating the result of tracking the object using the cropped image and the selected neural network model.

4. The method of claim 3, wherein the neural network models comprise a first neural network model for a first size of the crop region and a second neural network model for a second size of the crop region.

5. The method of claim 4, wherein the selecting of the neural network model comprises:
selecting the first neural network model, in response to the size of the crop region being the first size; and
selecting the second neural network model, in response to the size of the crop region being the second size.

6. The method of claim 4, wherein the first size is smaller than the second size, and
the first neural network model is configured to amplify input feature information more than the second neural network.

7. The method of claim 4, wherein the first size is smaller than the second size, and
the first neural network model is configured to amplify input feature information more than the second neural network model by increasing a channel size using more weight kernels than the second neural network.

8. The method of claim 4, wherein the first size is smaller than the second size, and
the first neural network model is configured to amplify input feature information more than the second neural network model by using a smaller pooling window than a pooling window in the second neural network.

9. The method of claim 3, wherein the neural network models share at least one weight with each other.

10. A non-transitory computer-readable storage medium storing instructions that, when executed by a processor, cause the processor to perform the method of claim 1.

11. An apparatus, the apparatus comprising:
a processor configured to:
estimate a dynamic characteristic of an object in an input image based on frames of the input image, wherein the dynamic characteristic of the object includes at least one of a change of size, a change of shape, or a change of location of the object;
determine a size of a crop region for a current frame of the input image based on the dynamic characteristic of the object;
generate a cropped image by cropping the current frame based on the size of the crop region; and
generate a result of tracking the object for the current frame using the cropped image.

12. The apparatus of claim 11, wherein the dynamic characteristic comprises a movement of the object, and
the processor is further configured to increase the size of the crop region, in response to the movement meeting a threshold, and to decrease the size of the crop region, in response to the movement failing to meet the threshold.

13. The apparatus of claim 11, wherein the processor is further configured to:
select a neural network model corresponding to the size of the crop region from among neural network models configured to track the object; and
generate the result of tracking the object using the cropped image and the selected neural network model.

14. An apparatus, the apparatus comprising:
a processor configured to:
estimate a dynamic characteristic of an object in an input image based on frames of the input image;
determine a size of a crop region for a current frame of the input image based on the dynamic characteristic of the object;
generate a cropped image by cropping the current frame based on the size of the crop region;
select a meural network model corresponding to the size of the crop region from among neural network models configured to track the object; and
generate a result of tracking the object for the current frame using the cropped image and the selected neural network model,
wherein the neural network models comprise a first neural network model for a first size of the crop region and a second neural network model for a second size of the crop region.

15. The apparatus of claim 14, wherein the first size is smaller than the second size, and
the first neural network model is configured to amplify input feature information more than the second neural network.

16. The apparatus of claim 14, wherein the first size is smaller than the second size, and
the first neural network model is configured to amplify input feature information more than the second neural network model by increasing a channel size using more weight kernels than the second neural network.

17. The apparatus of claim 14, wherein the first size is smaller than the second size, and
the first neural network model is configured to amplify input feature information more than the second neural network model by using a smaller pooling window than the second neural network.

18. AR-A.device, comprising:
a camera configured to generate an input image based on sensed visual information; and
a processor configured to:
estimate a dynamic characteristic of an object in the input image based on frames of the input image;
determine a size of a crop region for a current frame of the input image based on the dynamic characteristic of the object;
generate a cropped image by cropping the current frame based on the size of the crop region;

select a neural network model corresponding to the size of the crop region from among neural network models configured to track the object, and generate a result of tracking the object for the current frame using the cropped image and the selected neural network model, wherein the neural network models share at least one weight with each other.

19. The device of claim 18, wherein the dynamic characteristic comprises a movement of the object, and the processor is further configured to increase the size of the crop region, in response to the movement meeting a threshold, and to decrease the size of the crop region, in response to the movement failing to meet the threshold.

20. The apparatus of claim 13, wherein the neural network models comprise a first neural network model for a first size of the crop region and a second neural network model for a smaller second size of the crop region.

21. The apparatus of claim 20, wherein the first neural network model is configured to amplify input feature information more than the second neural network.

22. The apparatus of claim 20, wherein the first neural network model is configured to amplify input feature information more than the second neural network model by increasing a channel size using more weight kernels than the second neural network.

23. The apparatus of claim 20, wherein the first neural network model is configured to amplify input feature information more than the second neural network model by using a smaller pooling window than the second neural network.

24. The device of claim 18, wherein the dynamic characteristic of the object includes at least one of a change of size, a change of shape, or a change of location of the object.

25. The device of claim 18, wherein the neural network models comprise a first neural network model for a first size of the crop region and a second neural network model for a smaller second size of the crop region.

* * * * *